United States Patent [19]

Bryan

[11] Patent Number: 5,798,154

[45] Date of Patent: Aug. 25, 1998

[54] FLEX WRAPPED VACUUM INSULATOR

[76] Inventor: Lauri Bryan, 3760 Manchester St., Boise, Id. 83704

[21] Appl. No.: 713,746

[22] Filed: Sep. 13, 1996

Related U.S. Application Data

[63] Continuation-in-part of Ser. No. 572,291, Dec. 13, 1995, abandoned.

[51] Int. Cl.⁶ .................... E04C 2/34; E04B 1/62
[52] U.S. Cl. .................... 428/35.3; 428/35.8; 428/35.9; 428/34.5; 428/69; 428/71; 428/75; 428/76; 428/137; 52/788.1; 220/420
[58] Field of Search .................... 428/920, 35.2, 428/35.3, 35.4, 35.5, 69, 71, 75, 76, 34.5, 35.7, 35.8, 35.9, 131, 137; 52/788.1; 220/420, 422, 423, 424, 425

[56] References Cited

U.S. PATENT DOCUMENTS

| | | | |
|---|---|---|---|
| 3,913,776 | 10/1975 | Tautam | 220/420 |
| 4,513,041 | 4/1985 | Delluc | 428/920 |
| 4,579,756 | 4/1986 | Edgel | 428/920 |
| 4,594,279 | 6/1986 | Yoneno et al. | 428/920 |
| 4,669,632 | 6/1987 | Kawasaki et al. | 428/35.3 |
| 4,671,979 | 6/1987 | Adiletta | 428/74 |
| 5,252,408 | 10/1993 | Bridges et al. | 428/920 |
| 5,376,424 | 12/1994 | Watanabe | 428/920 |
| 5,508,106 | 4/1996 | Yashino | 220/420 |

*Primary Examiner*—Rena L. Dye

[57] ABSTRACT

A vacuum packaged insulating structure designed to insulate containers, pipes, and ducts. One type of insulator comprises a vacuum sealed metal foil composite plastic flexible wrap which encloses a double-walled structural frame. The flexible wrap takes the shape of the structural frame and seals the vacuum space created between the walls of the frame. The vacuum space created in the insulator surrounds the cavity to be insulated. In another type of insulator, the vacuum sealed flexible wrap encloses a compressed body of particulate insulating material shaped and formed to surround a duct shaped cavity. The evacuated insulating material prevents the flex wrap from collapsing unto itself and surrounds the cavity to be insulated providing a continuous vacuum form of insulation through the evacuated interstices among the particles of the particulate insulating material.

14 Claims, 7 Drawing Sheets

FLEX WRAPPED VACUUM INSULATOR

This is a Continuation-in-Part of Ser. No. 08/572.291 filed 1995 Dec. 13, now abandoned.

BACKGROUND-FIELD OF INVENTION

This invention relates to thermal insulators, specifically to insulators utilizing a vacuum sealed flexible wrap.

BACKGROUND-DESCRIPTION OF PRIOR ART

The fact that a vacuum has excellent thermal insulating properties has long been known. At present there are only two types of vacuum insulators using a flexible wrap. One type as disclosed by U.S. Pat. No. 4,513,041 to Delluc (1985) discloses a flexible sheath enclosing an evacuated and capped hollow tubular structure. The Delluc patent discloses the use of these tubular cells embedded in overlapping layers in an insulating panel. The disadvantage to this type of insulating panel are the thermal shorts or heat bridges in the walls of the cells themselves and in the material of the insulating panel between and surrounding these cells. A similarly disadvantaged U.S. Pat. No. 4,579,756 to Edgel (1986) discloses an insulating sheet material made of evacuated box chambers held together in closely spaced side-by-side arrangement. Edgel's patent illustrates how this sheet of evacuated cells can be installed around pipes, walls etc. Again, the thermal shorts in the walls of the numerous cells and the break in the vacuum between the cells negates the useful use of the vacuum. Edgel also discloses a stand alone evacuated cell or insulating panel as applied to an evacuated double walled window. It must be noted that a transparent vacuum insulated panel enclosed in a transparent flexible wrap has the disadvantage of radiant heat transfer and air permeation through the flexible wrap. At present there are no references to a useful or functional vacuum insulator comprising a structural frame which defines a empty space that is enclosed in a vacuum sealed metallized air impermeable flexible wrap. The above mentioned patents if implemented would be costly to produce and are not as effective for retarding heat flow as current still air insulators such as foams or fiberglass. A true cost effective "THERMOS"-like insulator utilizing a vacuum sealed flexible wrap which can be used around pipes, ducts, and containers such as water jugs, coolers etc. has not been developed. Millions of people are still sending millions of gallons of water down the drain each day while inconveniently waiting for their water to get hot. Besides the waste of energy reheating cold water going into the water heater it is also a terrible waste of potable water. Millions of air conditioners are still recooling hot air in attic ducts and most common containers are still insulated with foams because "THERMOS"-like vacuum insulation is currently not cost effective.

The other more conventional and currently favored type of vacuum insulation involves a vacuum sealed bag containing a particulate insulating material such as powder of perlite, sintered polyethylene, silica gel and the like. U.S. Pat. No. 4,594,279 to Yoneno et al.(1986) discloses an insulating panel comprising a mass of flaky perlite enclosed in a vacuum sealed pliable container. U.S. Pat. No. 4,669,632 to Kawasaki et al.(1987) and Watanabe(1994) further improve this type of insulating panel by improving the metallized sealing bag so that it remains gas impermeable and reduces heat transmission through the metallic layers at the peripheral sealed edges separating one side of the insulating panel from the other. U.S. patent to Bridges et al.(1993) discloses a very thin all metallic evacuated shell enclosing a cavity containing particulate insulating material. All of these types of insulating panels utilize particulate insulating material to support the pliable shell from collapsing as it is evacuated. The cost for this structural support is the diminished insulating effect of the vacuum and the increased thermal conduction through the particulate matter. The best insulation is a "THERMOS"-like deep vacuum space protected from radiant heat transmission by polished metal surfaces or by non compacted insulating material. Furthermore, all of these flex wrapped vacuum insulators are vacuum insulating panels. A plurality of these panels are placed in the walls of refrigerating units, coolers etc. and are then foamed around. The disadvantage is that there are breaks in the vacuum insulation between panels. The prior art has concentrated on reducing the thermal conduction along the peripheral edges of these insulating panels but one continuous vacuum insulator which eliminates completely many of these outside edges has not been developed.

OBJECTS AND ADVANTAGES

Several objects and advantages of my invention are:

(a) To provide a thermal insulator that utilizes a continuous "THERMOS"-like vacuum space to surround pipes, ducts, and containers;

(b) To provide a vacuum insulator that does not have the numerous heat bridges that deteriorate insulating effectiveness as disclosed by previous attempts to use flex wrapped vacuum insulation.

(c) To provide a vacuum insulator that is cost effective, inexpensive to manufacture and easily produced with existing and proven technology in the vacuum packaging industry.

(d) To provide a vacuum insulator having the strength and capability to maintain a deep vacuum with minimal heat shorts and without the numerous breaks in vacuum that exists between vacuum panels as disclosed by prior methods of using flex wrapped insulators.

(e) To provide ONE vacuum insulator that more efficiently replaces a plurality of vacuum insulating panels or evacuated cells, eliminating completely many of the edges that are thermal conducting from one side of the insulating panels to the other. This reduction in thermal conducting edges and corresponding reduction in peripheral sealed seams results in longer insulating effectiveness because of less vacuum leakage through the sealed seams.

Further objects and advantages will become apparent from a consideration of the drawings and ensuing description.

SUMMARY OF THE INVENTION

The Flex Wrapped Vacuum Insulator of the present invention is a vacuum packaged insulating structure designed to insulate pipes, ducts, and insulated containers such as coolers, water jugs, etc. One type of insulator comprises a double-walled insulating structure that defines an empty space which completely surrounds the cavity or object to be insulated. This insulating structural frame is placed in a metallized flexible bag or wrap which is manipulated and everted to conform to the outside surface of the outer wall and to the inside surface of the inner wall which surrounds the cavity to be insulated. The insulator is vacuum sealed creating a vacuum space between the walls of the frame. The frame acts as a barrier and keeps the flexible wrap from collapsing unto itself. To protect against radiant heat transfer, the interior surface of the frame surrounding the vacuum space should be metallized. An insulating material of a particulate nature could also be charged into the vacuum space to protect against radiant heat transfer. The vacuum created in the microscopic cavities of the insulating material would provide effective vacuum insulation. The insulating material would also provide some insulating insurance in the event the vacuum was not maintained.

In another type of insulator, a compressed body of particulate insulating material is shaped and formed to surround a duct shaped cavity. This body of insulating material is vacuum packaged as described above providing a continuous vacuum form of insulation surrounding the cavity and the support structure required to keep the flex wrap from collapsing unto itself

BRIEF DESCRIPTION OF THE DRAWINGS

In the drawings, closely related figures have the same number but different alphabetical suffixes.

DETAILED DESCRIPTION OF THE PREFERRED EMBODIMENTS

Figure 1A:
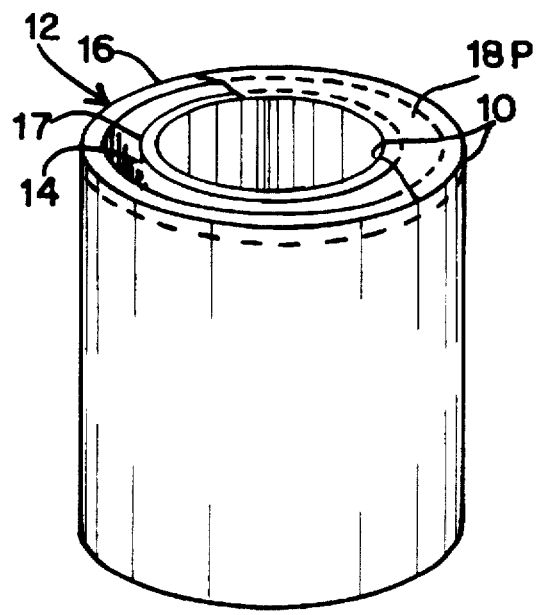
FIG. 1A shows a perspective view with top partially cut away of a Flex Wrapped Vacuum Insulator having a closed at one end tubular shaped double-walled frame.
Figure 1B:
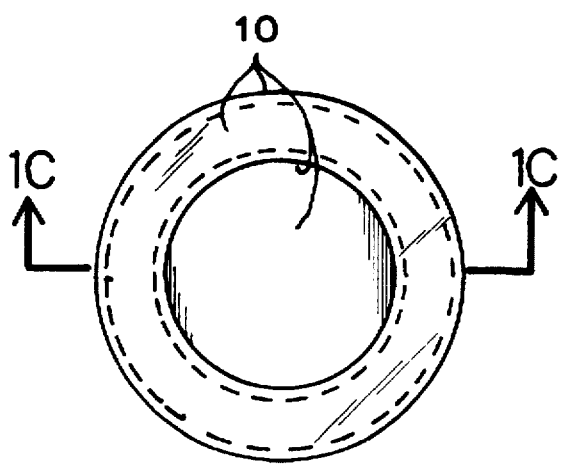
FIG. 1B shows a top view of this insulator.
Figure 1C:
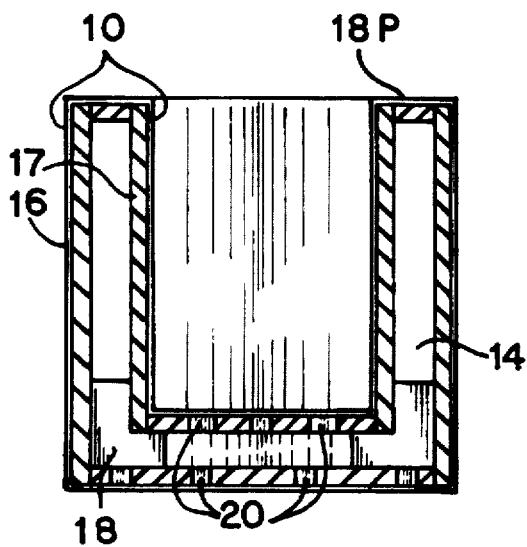
FIG. 1C shows a view of this insulator cut along the line 1C—1C of FIG. 1B.
Figure 1D:
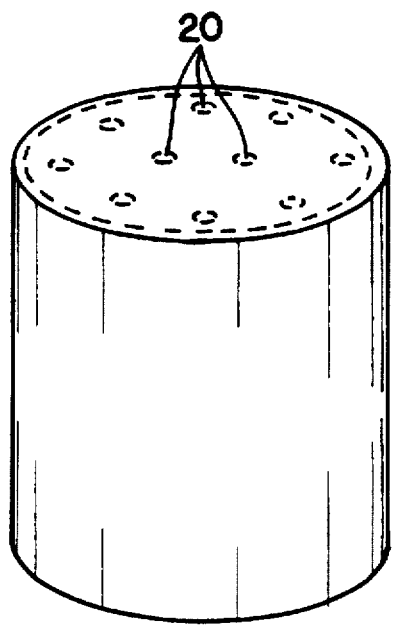
FIG. 1D shows a bottom perspective view of this same insulator.

One embodiment of the flex wrapped vacuum insulator of the present invention is illustrated in FIG. 1A (perspective view with top partially removed). The insulator has a vacuum sealed metallized flexible wrap 10 which encloses a double-walled structural frame 12 which encloses a vacuum space 14 created between the walls of the frame which have evacuation holes 20. This cylindrical container shaped structure has an outer closed at one end tubular shaped body of rigid material 16 which encloses in spaced apart relationship a similarly shaped but smaller inner body of rigid material 17. The enclosure support spacer 18P between and about the periphery of the open ends of both inner and outer bodies of rigid material supports the flexible wrap from entering the vacuum space created between the walls of the frame. The vacuum space is created between the inside surface of body 16 and the outside surface of body 17. Due to the inherent structural strength of cylindrical structures (Arch effect) minimum internal support structure is required to support the walls of the frame from collapsing into the vacuum. The internal support spacers 18 separating the closed ends of the rigid bodies of material bear almost the entire load. Consequently as shown by FIG. 1C, a nearly continuous insulating vacuum space surrounds the inner body of rigid material and thus the open cavity to be insulated.

The insulator illustrated in FIGS. 1A to 1D is assembled by positioning a heat sealable metal foil composite plastic film bag so as the bottom or closed end of the bag covers the bottom inside portion of the inner body of rigid material. The bag completely covers the inside surface of the inner body of rigid material and is everted to enclose the enclosure support spacer and completely enclose the exterior surface of the outside body of rigid material. The open end of the bag extends past the closed end of the frame. This assembly is held in place and vacuum packaged in a vacuum chamber designed to vacuum seal bags. The bottom of the bag must be held in place or else it will be blown out the open end of the container. The frame can be made of any rigid material of sufficient strength to provide a barrier to the flex wrap and protect the vacuum space. The materials used should not weaken the vacuum by releasing vapor or outgassing. In the preferred embodiment(most cost effective), the two rigid bodies of material and support spacers are made of rigid PVC(poly-vinyl-chloride) or other plastic-like material suitable for the temperature range to be insulated. The support spacers may be press fitted, joined by an adhesive or chemically welded to the rigid bodies of material. However, the frame could also be formed, molded, and welded in one piece and enclosed in a number of metallized composite plastic films. The metal composite plastic film is composed of a metal foil sandwiched and adhesively affixed to a surface layer of polyester film to one side and to a plastic sealant layer on the other side. A polished metal surface should be introduced into the vacuum space to retard radiant heat transfer. The rigid bodies of material can also be made of metal separated by plastic support spacers. The advantage to this nearly all metal construction is that there is very little outgassing and minimum heat transfer through the plastic support spacers. The small amount of heat conducted through the metal foil in the flexible wrap can be further minimized by using a metallized flexible wrap wherein the portion of the flexible wrap covering the interior surface of the inner body of rigid material is made of a metal vacuum evaporation layer composite plastic film and the portion of the flexible wrap covering the exterior surface of the outer body of rigid material is made of a metal foil composite plastic film. These two portions of the flexible wrap are peripherally sealed together forming a circular heat seal. In other words, the bag is extended at the seal. The extended portion of the composite bag contains the foil and the portion of the bag on the opposite side of the seal contains the metal evaporative layer. The metal evaporation layer is thin resulting in reduced thermal conduction. This particular embodiment of the flex wrapped insulator has almost all of the advantages of an all metal vacuum insulator but without the increased conduction of the metal. The method of reducing the conductivety through the metallic layers of the bag was discussed in the prior art and has been mentioned to show that this particular configuration could possibly be the most efficient container insulator yet devised.

Figures 2A, 2B:
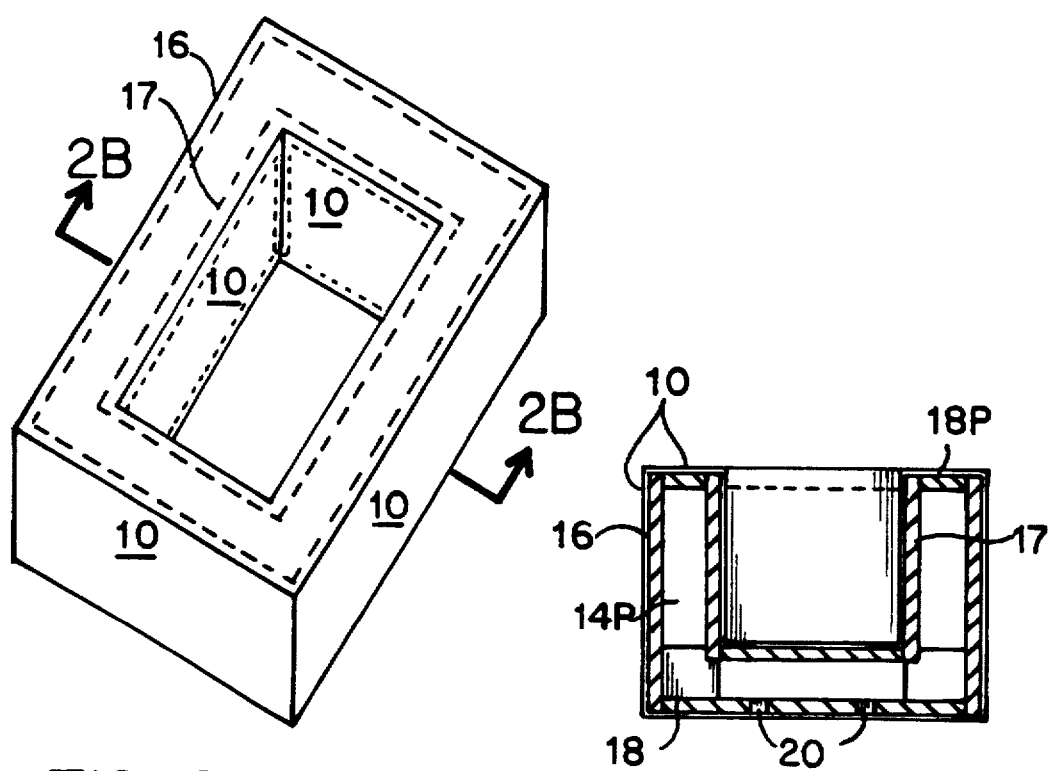
FIGS. 2A to 2C show similar views of an insulator having a closed at one end square duct shaped double-walled frame.
Figure 2C:
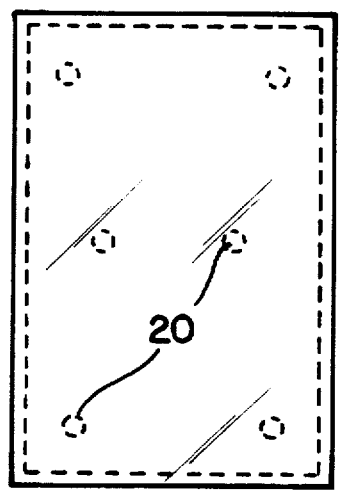

Another variation of this container shaped insulator is illustrated in FIGS. 2A to 2C. This insulator is assembled as above except the shape of the insulator and the two rigid bodies of material are closed at one end square duct shape.

The flexible wrap for this insulator and all the others described in this specification are sized to fit the various frames. This insulator does not have the inherent structural strength of the cylindrical container and requires additional internal support. A particulate insulating material such as powder of perlite, sintered polyethylene or the like can be charged into the vacuum space by standard methods to provide a barrier to radiant heat transmission and also to provide additional support. A polyurethane foam plate is also well suited for this purpose. The insulating material provides insurance in the event the vacuum is not maintained so some insulating value will still exist. In FIG. 2B the vacuum space containing particulate insulating material is labeled 14P. It should be noted that an insulating material could also be placed in the vacuum space of the above described cylindrical-container shaped insulator as well.

Figure 3A:
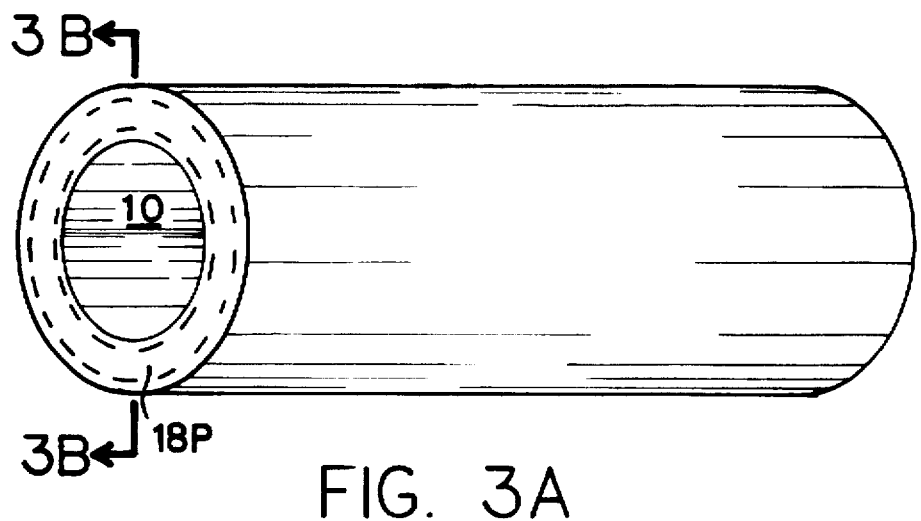
FIGS. 3A to 3C show various aspects of an insulator having a tubular or pipe shaped double-walled frame.
Figure 3B:
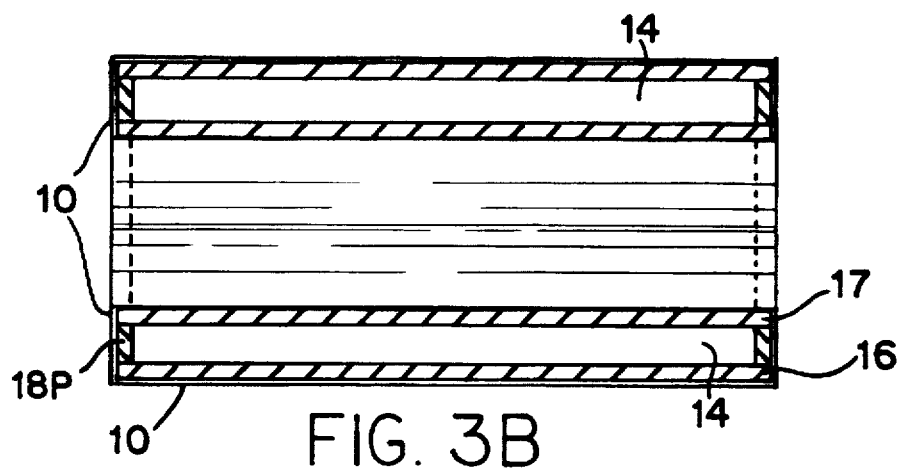
Figure 3C:
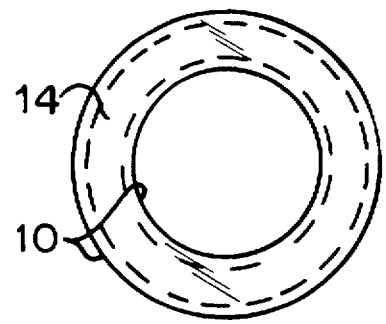

Another very important embodiment of the present invention is illustrated in FIG. 3A (a perspective view of a tube shaped insulator). The double-walled frame of this insulator has a tubular shaped outside body of rigid material 16 which encloses in spaced apart relationship a smaller tubular shaped inside body of rigid material 17. Peripheral support spacers 18P enclose the vacuum space created between the outside surface of body 17 and the inside surface of body 16. The frame is enclosed by a metallized cylindrical shaped wrap that is over twice its length and which has one end everted through the inside portion of the inner tube. Both ends of the wrap are on the same end of the frame and during vacuum packaging are clamped and sealed together over a rigid rod. A circular heat seal is formed using circular heating strips instead of the linear heat seal formed by linear heating strips as described in FIGS. 1 and 2. Alternatively both ends of the insulator could be heat sealed by this method. This tube shaped insulator encloses a cavity opened at both ends and the flexible wrap 10 contiguously covers the outside surface of the outer body 16, the two peripheral support spacers 18P and the inside surface of body 17. Due to the inherent structural strength of this cylindrical shaped insulator, very little support structure is needed to keep the walls from collapsing. In fact, the only role any internal support spacers play is to maintain the two tube shaped bodies in spaced apart relationship against the force of gravity. As apparent from FIGS. 3A to 3C, a nearly continuous "Thermos-like" insulating vacuum space 14 surrounds the cavity to be insulated for which pipes can be placed. This insulator has a low emissivity reflective surface on both the outside surface of body 16 and inside surface of body 17 surrounding the cavity and would therefore make an excellent duct for hot attics etc. Similar to the previously described cylindrical container shaped insulator, the rigid bodies of material can be changed to a square duct shape and the insulator will become a square or rectangular insulated duct(not shown).

Figure 4A:
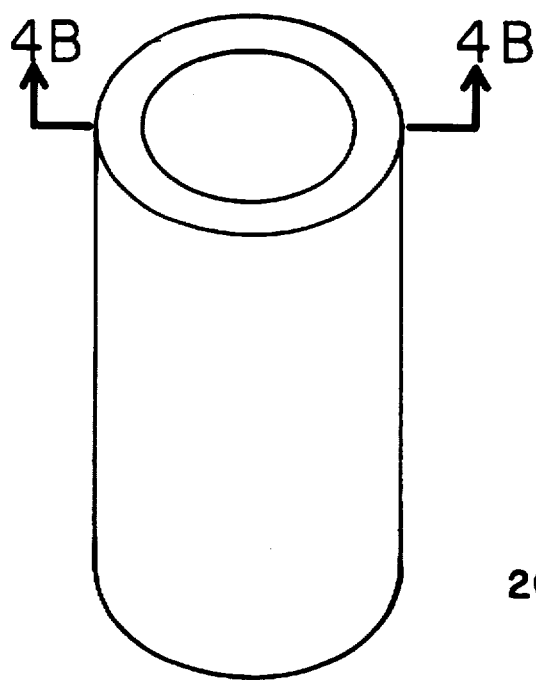
FIG. 4A shows a perspective view of a cylindrical or closed at one end tubular shaped insulated container and FIG. 4B shows a vertical cross section cut along the line 4B—4B of FIG. 4A.
Figure 4B:
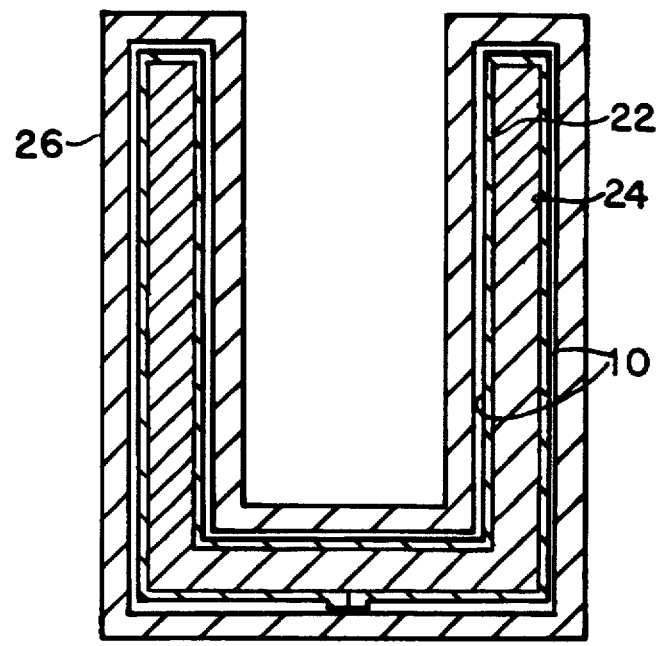
Figure 4C:
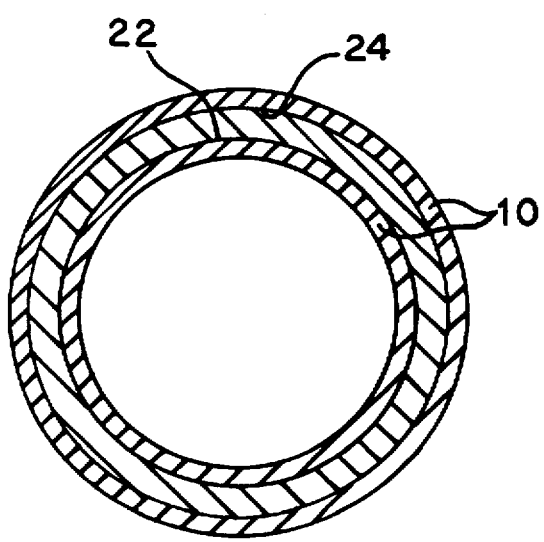
FIG. 4C shows a cross sectional view of the Flex Wrapped Vacuum Insulator having a particulate insulating material structure contained within the frame of this same cylindrical container.
Figure 5A:
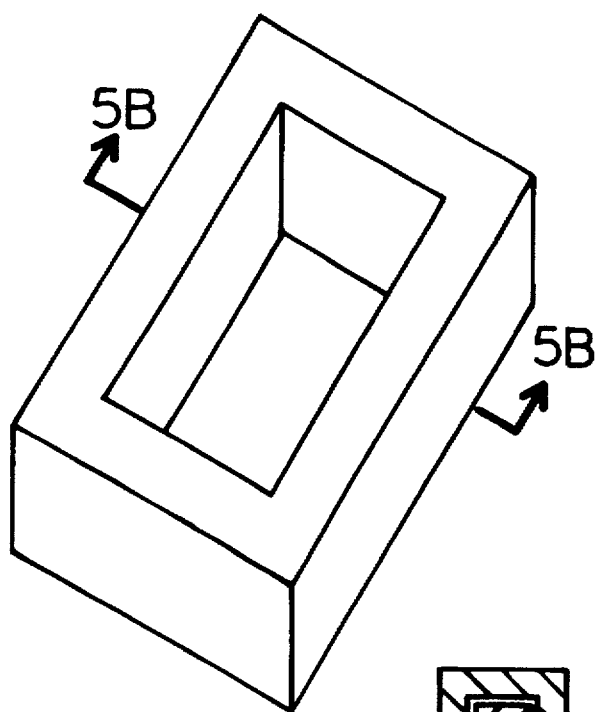
FIGS. 5A to 5C show similar views of a Flex Wrapped Vacuum Insulator having a particulate insulating material structure enclosed inside the walls of an open at one end empty box shaped container.
Figure 5B:
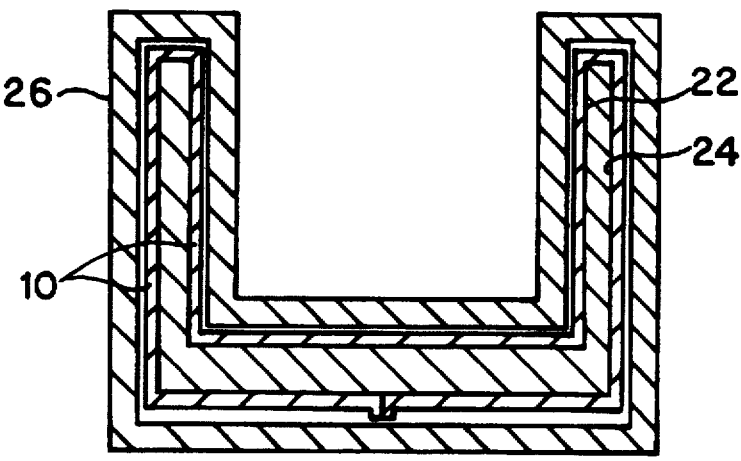
Figure 5C:
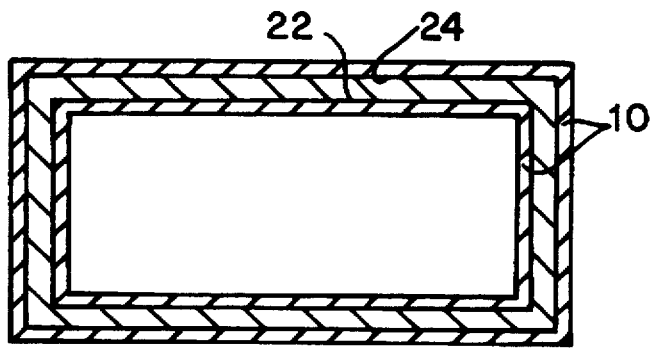

In another type of flex wrapped insulator, the insulating material itself becomes the only structure that keeps the flex wrap from collapsing in on itself As previously described it also functions as a radiant barrier. A body of particulate thermal insulating material is formed and compressed into the various shapes as disclosed and vacuum packaged in the manner as previously disclosed. The body of insulating material has an interior surface 22 that surrounds an open cavity and a opposite exterior surface 24. The flex wrap conforms to and encloses the interior and exterior surfaces of the evacuated body of insulating material. Various foamed plastic materials such as polyurethane foam can be formed into the shapes as illustrated in FIGS. 6-7. The flex wrap can also be formed in the cavity between the walls of a structure having the shape of a double-walled insulated container wherein the bottom or closed end of the outside wall has been removed. Starting from the bottom of the container, the flex wrap can be made to take the shape of the cavity by positioning the bottom of the sealing bag to cover the bottom of the inside wall and then everting or folding the rest of the bag into the cavity between the walls of the container. The container shaped wrap is filled with an insulating material and vacuum sealed. FIG. 4A shows a perspective view of an insulated cylindrical container opened at one end. FIG. 4B illustrates a cross section of this insulated container showing the insulator within the walls of the container frame 26. The cross section views in FIGS. 4B and 4C shows the insulator continuously surrounding the open cavity to be insulated. FIGS. 5A to 5C show similar views of an insulated container and insulator having an open at one end empty box shape. As shown by these figures, the cavity to be insulated is completely surrounded by a particulate insulating material whereby a vacuum is created in the interstices among the particles of the insulating material. As mentioned in the prior art, only flex wrapped vacuum insulating panels have been developed. Five vacuum insulating panels are required to insulate a square picnic cooler type container(bottom and 4 sides) and these panels must then be foamed around. Each of these insulating panels have 4 sides or a total equivalent of 20 sides with periperal sealed edges which are thermal conducting from one side of the insulating panel to the other. There are also breaks in the vacuum insulation between panels. The presently described invention can insulate this same picnic cooler with continues vacuum insulation and with an equivalent of only 4 sides or peripheral edges(top 4 sides of cooler) which are thermal conducting from the inside to the outside portion of the insulator.

Figure 6A:
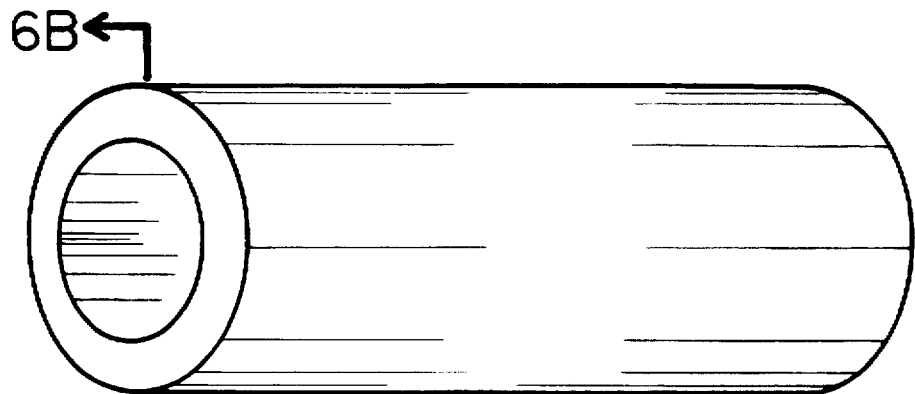
FIGS. 6A to 6C show various views of an insulator of particulate insulating material structure having a tube shape.
Figure 6B:
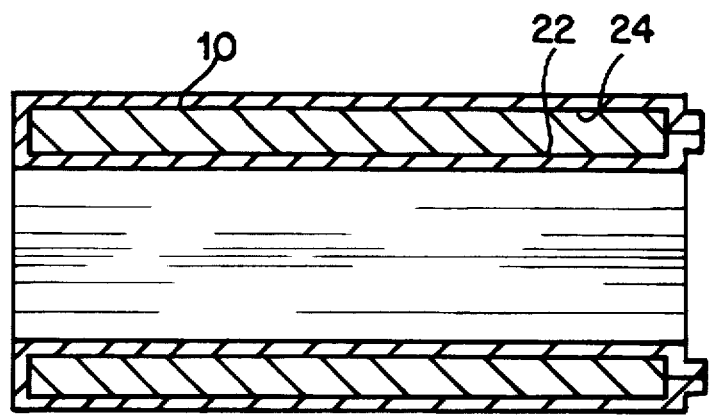
Figure 6C:
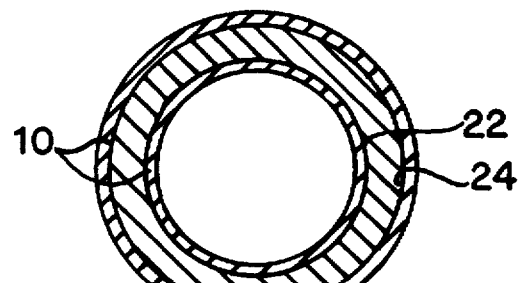
Figure 7A:
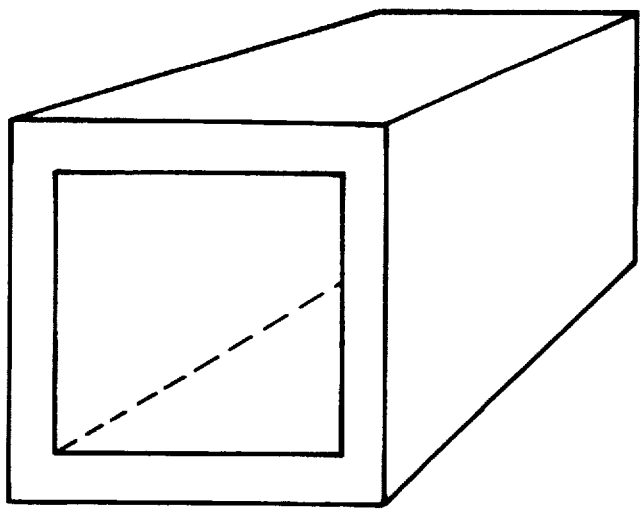
FIGS. 7A and 7B show a perspective and cross sectional view of an insulator of particulate insulating material structure having a square duct shape.
Figure 7B:
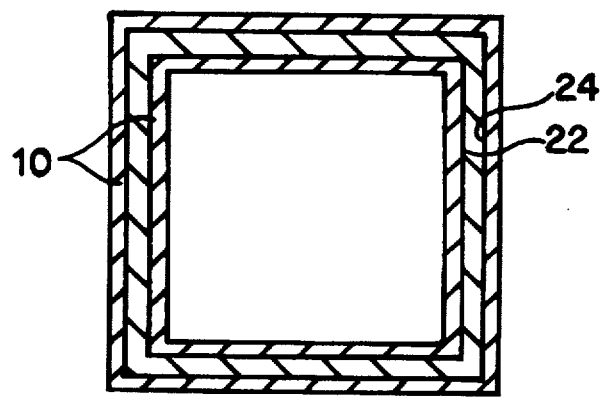

FIGS. 6A to 6c show perspective and cross sectional views of a vacuum packaged body of compressed insulating material having a pipe-like or cylindrical duct shape. FIGS. 7A and 7B show similar views of a square duct-like insulator. These insulators are assembled in the above described method for vacuum packaging tube or duct shape double-walled structural frames.

From the description above, a number of advantages of my flex wrapped insulator becomes apparent.

(a) To provide an insulator that utilizes a continuous "THERMOS-LIKE" or vacuum bottle-like deep vacuum space to insulate pipes, cylindrical ducts, and open cylindrical containers—The best insulation known.

(b) To provide a box-like duct and container insulator that has a continuous vacuum insulating material that completely surrounds the space or object to be insulated.

(c) To provide ONE vacuum insulator that more efficiently replaces a plurality of vacuum insulating panels.

(d) To provide a vacuum insulator that does not have the numerous breaks in the vacuum insulation that exists between vacuum panels or cells as disclosed by prior methods of using flex wrapped insulators.

(e) To provide a vacuum insulator that does not have the numerous heat bridges that exists at the peripheral edges of the numerous insulating panels it replaces. The thermal conduction from one side of the insulator to the other through these peripheral edges as previously shown is five times greater using the previously disclosed method of insulating box-like coolers for one example.

(d) To provide a Flex Wrapped Vacuum Insulator having fewer heat sealed seams and therefore longer effective insulating life because of less vacuum leakage through the seams.

Accordingly, the reader can see that the Flex Wrapped Vacuum Insulator of the present invention can take a variety of shapes and be used for a variety of insulating purposes. The insulator uses the concept of flex wrapped vacuum insulation to its fullest potential to insulate containers and pipe-like cavities. It provides ONE cost effective vacuum insulator that completely surrounds the cavity to be insulated not requiring a multitude of insulating panels which it replaces. The insulator as presently described has far fewer thermal heat bridges and vacuum breaks and provides a far superior insulating value as compared to previously disclosed insulators using flexible wraps.

The advantage of vacuum sealing a very thin metallic envelope about a double walled structural frame is that a thermal break can be created between the walls of the frame. Applicant has made no attempt to illustrate the numerous different design choices and spacing means arrangements that achieve this advantage. Another advantage of the present invention is that the structural frame can be assembled in modular form and does not require the welding together of parts to form an air tight chamber. As mentioned in applicant's prior application this facilitates the use of cheaper plastic materials which can be more effectively protected from outgassing. For instance, the inside and outside walls can be vacuum sealed individually to protect the vacuum from outgassing and also to provide a metallized surface to retard radiant heat transmission. There are many other advantages inherent in the presently described invention that can reduce the cost and increase the efficiency of vacuum insulation. The structural frame can be made not only with cheaper materials but can also be skeletal or reticulated. Applicant has made no attempt to show all of the embodiments that detail all of the advantages inherent in the present invention but rather has showed the most basic and preferred embodiments. Thus the scope of the invention should be determined by the appended claims and their legal equivalents, rather than by the examples given.

I claim:

1. A vacuum container insulator comprising a vacuum sealed metallized flexible wrap enclosing a double walled structural frame with evacuation openings leading to a defined vacuum space between the walls of said structural frame, said structural frame comprising a container shaped outside body of rigid material enclosing a smaller container shaped inside body of rigid material, spacing means for maintaining said outside and said inside bodies in spaced apart relationship, and an enclosure support means for supporting said flexible wrap between the open ends of said inside and said outside bodies, said flexible wrap closely fits and clings tight to the exterior surface of said structural frame which is opposite the surface surrounding said vacuum space, said spacer means and said enclosure support means additionally function as a means for providing a thermal break between said inside and said outside container shaped bodies whereby a superior vacuum container insulator is constructed that reduces thermal conduction between the walls of the insulator and can be assembled in modular form reducing manufacturing costs.

2. The insulator of claim 1 wherein said flexible wrap is a metallic foil composite plastic film and said spacing means is composed of material having a higher insulating value than said inside and said outside container shaped bodies.

3. The insulator of claim 2 wherein said structural frame has a closed at one end tubular shape.

4. The insulator of claim 3, further including means for preventing radiant heat transmission between said inside and said outside bodies of rigid material.

5. The insulator of claim 2 wherein said structural frame has a closed at one end square duct shape.

6. The insulator of claim 5, further including the placement of a particulate insulating material into said vacuum space.

7. A vacuum duct insulator comprising a vacuum sealed air impermeable flexible wrap enclosing a double walled structural frame having evacuation openings leading to a duct shaped vacuum space between the walls of said structural frame, said structural frame comprising a duct shaped outside body of rigid material, a smaller duct shaped inside body of rigid material, and spacer means between the open ends of said inside and outside bodies for maintaining said inside and said outside bodies in spaced apart relationship, said flexible wrap closely fits and clings tight to the interior surface of said inside body, the exterior surface of said spacer means, and the exterior surface of said outside body.

8. The insulator of claim 7 wherein said flexible wrap is a metallic foil composite plastic film and said spacer means additionally functions as a means for providing a thermal break between said inside and said outside bodies of rigid material whereby a superior vacuum insulator is constructed that reduces thermal conduction between the inner and outer walls of said structural frame and can be assembled in modular form without welding together parts to form an air tight chamber.

9. The insulator of claim 8 wherein said structural frame has a pipe shape.

10. The insulator of claim 9, further including means for preventing radiant heat transmission between said inside and said outside bodies.

11. The insulator of claim 8 wherein said structural frame has a square duct shape.

12. The insulator of claim 11, further including the placement of a particulate insulating material into said vacuum space.

13. A vacuum duct insulator comprising a duct shaped body of particulate insulating material and a one piece metallized composite plastic flexible wrap vacuum sealed about said duct shaped body of particulate insulating material, said body of particulate insulating material having an inside surface that surrounds a duct shaped cavity and an opposite outside surface, said flexible wrap closely fits and clings tight to the outside and inside surfaces of said body of insulating material and completely encloses said body of insulating material, said one piece flexible wrap having opposite ends which are thermally bonded and sealed together to form a circular heat seal whereby a vacuum duct insulator is constructed by vacuum packing a duct shaped body of particulate insulating material in a metallized plastic wrap.

14. The insulator of claim 13 wherein said flexible wrap is a metallic foil composite plastic film and said body of insulating material is composed of foamed polyurethane.

* * * * *